United States Patent
Haas et al.

(10) Patent No.: US 7,113,574 B1
(45) Date of Patent: Sep. 26, 2006

(54) INTEGRATED TELEPHONE SET WITH AN XDSL-MODEM

(75) Inventors: Steven Haas, Zur Yigal (IL); Shimon Peleg, Hod-Hasharon (IL)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/275,040

(22) PCT Filed: May 22, 2000

(86) PCT No.: PCT/EP00/04650

§ 371 (c)(1),
(2), (4) Date: Feb. 10, 2003

(87) PCT Pub. No.: WO01/91440

PCT Pub. Date: Nov. 29, 2001

(51) Int. Cl.
*H04M 11/00* (2006.01)

(52) U.S. Cl. .............................. 379/90.01; 379/93.08; 379/110.01

(58) Field of Classification Search ............. 379/90.01, 379/93.01, 93.05–93.08, 110.01, 413, 93.28; 375/222, 219; 370/493, 442, 470, 524, 290, 370/366, 222; 307/131; 710/302, 62, 301; 711/115; 713/300, 320, 324
See application file for complete search history.

(56) References Cited

U.S. PATENT DOCUMENTS

| | | | |
|---|---|---|---|
| 4,503,288 A | | 3/1985 | Kessler |
| 5,177,735 A | * | 1/1993 | Blaszykowski et al. ..... 370/366 |
| 5,463,261 A | * | 10/1995 | Skarda et al. ............... 307/131 |
| 5,884,102 A | * | 3/1999 | England et al. ............... 710/62 |
| 5,889,856 A | | 3/1999 | O'Toole et al. |
| 5,944,831 A | * | 8/1999 | Pate et al. ................... 713/324 |
| 5,991,311 A | * | 11/1999 | Long et al. ................. 370/524 |
| 6,005,873 A | | 12/1999 | Amit |
| 6,061,392 A | | 5/2000 | Bremer et al. |
| 6,268,815 B1 | * | 7/2001 | Gustavsson et al. ........ 341/143 |
| 6,314,102 B1 | | 11/2001 | Czerwiec et al. |
| 6,373,860 B1 | * | 4/2002 | O'Toole et al. ............. 370/493 |
| 6,449,348 B1 | * | 9/2002 | Lamb et al. ............. 379/93.36 |
| 6,650,697 B1 | * | 11/2003 | Tate et al. ................... 375/222 |
| 6,738,418 B1 | * | 5/2004 | Stiscia et al. ............... 375/222 |

FOREIGN PATENT DOCUMENTS

| | | |
|---|---|---|
| EP | 0 891 067 A2 | 1/1999 |
| EP | 0 944 281 A2 | 9/1999 |
| JP | 07-030685 | 1/1995 |
| JP | 11-088376 | 3/1999 |
| JP | 11-308352 | 11/1999 |

OTHER PUBLICATIONS

Office Action from Japanese Patent Office dated Aug. 8, 2005.

* cited by examiner

*Primary Examiner*—Stella Woo
(74) *Attorney, Agent, or Firm*—Jenkins, Wilson, Taylor & Hunt, P.A.

(57) ABSTRACT

Integrated telephone with an xDSL-modem (2), comprising a splitter unit (6) for separating telephone signals received via a telephone line (9) in a low-frequency band from data signals received in a high-frequency band via the telephone line (9), a telephone set (3) connected to the splitter unit (6) for the transmission of telephone signals in the low-frequency band; and a high-speed xDSL-modem (2) connected to the splitter unit (6) for the transmission of data signals in the high-frequency band.

13 Claims, 2 Drawing Sheets

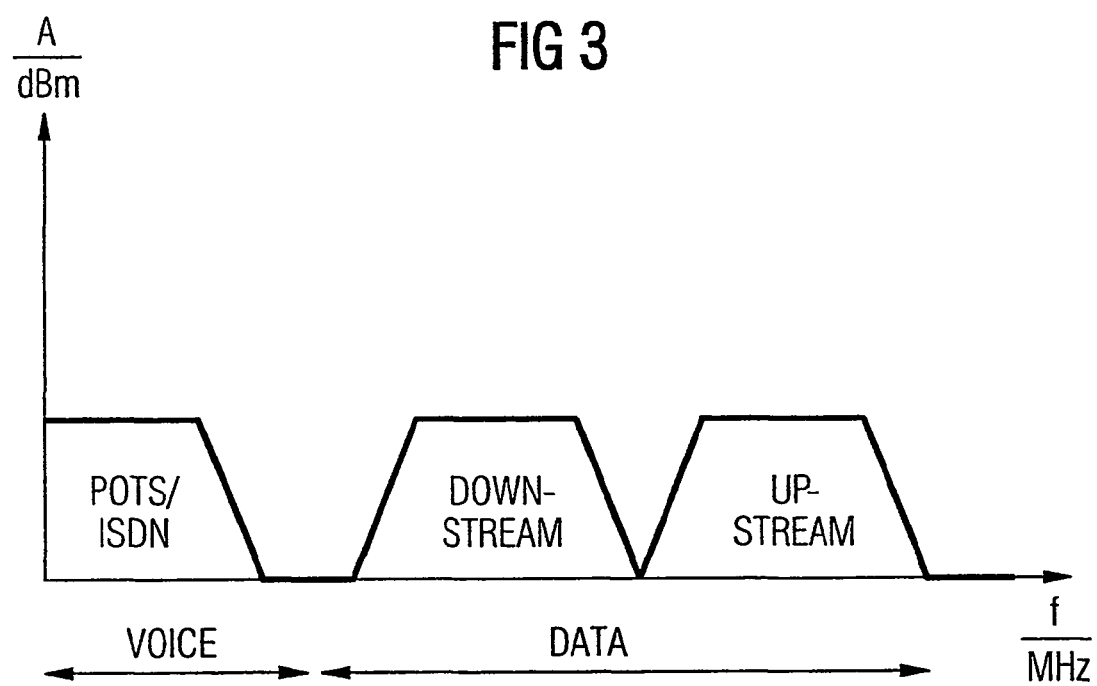

INTEGRATED TELEPHONE SET WITH AN XDSL-MODEM

TECHNICAL FIELD

The invention relates to an integrated telephone with an xDSL-Modem wherein data signals and telephone signals are transmitted without interfering with each other.

BACKGROUND ART xDSL (DSL: Digital Subscriber Line) is a family of telecommunication services including ADSL (Asymmetric DSL), RADSL (Rate-Adaptive DSL), SDSL (Symmetric DSL) and VDSL (Very High-Speed DSL). DSL provides a digital connection for customers to other end users. By using digital signalling methods, both voice and data can be transmitted over telephone lines but at much higher speeds than those speeds that are possible with ordinary modems. Modems are communication devices which convert binary digital information into electrical signals for the transmission via telephone lines and which convert these electrical signals back into a binary form at the receiving end. A conversion into the electrical signal form is known as modulation, whereas the conversion back to the binary form is known as demodulation. Modems are used for data transmission from or to a data communication equipment such as a laptop or a personal computer via the telephone line.

In POTS (POTS: Plain Old Telephone System), the frequency range between 0 and 4000 Hz is known as the voice channel and the frequency range from 300 Hz to 3000 Hz is known as a telephone frequency band. The voice signals are transmitted within the telephone frequency band as in-band telephone signals, whereas the telephone signals transmitted between 3000 and 4000 Hz are known as out-of-band signals. The signals within the in-band transmit the voice information, whereas the out-of-band signals are used for signalling and control purposes. Any frequencies above 4000 Hz are filtered out so that they do not interfere with the voice signal.

ISDN (ISDN: Integrated Services Digital Network) where each telephone wire pair running to a home has the capability to carry not one but two simultaneous voice conversations, known as Bearer channels or B-channels. The voice calls are carried as 64 KPBS digital signals (128 KPBS together) along with a separate digital signalling channel, or D-channel. The D-channel can be used for packet data services when not needed for signalling, whereas the B-channels can be used for anything like voice, data and even video. ISDN transmits signals within a low frequency range reaching from 0 Hz to a cut-off frequency of about 130 kHz.

FIG. 1 shows an integrated telephone set having a modem according to the state of the art. The integrated telephone set comprises a conventional telephone set and an analog modem which are both connected to a switching device or multiplexer. The switching device is linked via a telephone line to the telephone network. The telephone wire is usually a single twisted pair wire made of copper. The analog modem has an interface for a connection to the data communication equipment such as a laptop or a personal computer. The integrated telephone set shown in FIG. 1 integrates the telephone functions and the data communication functions. However, in the integrated telephone set as shown in FIG. 1, the telephone services and the data communication services are both transmitted within the same frequency band. The telephone service is carried in-band together with the data communication service, and a fault in the data communication link will cause a failure of the telephone service.

SUMMARY OF THE INVENTION

Accordingly, it is the object of the present invention to provide an integrated telephone set which is able to provide telephone services as well as data communication services wherein the telephone signal and the data signal are transported separately without interfering with each other.

This object is achieved by an integrated telephone set having the features of claim 1.

The invention provides an integrated telephone set with an xDSL-modem comprising a splitter unit for separating telephone signals received via the telephone line in a low-frequency band from data signals received in a high-frequency band via the telephone line, a telephone set connected to the splitter unit for bidirectional transmission of telephone signals in the low-frequency band, and a high-speed xDSL-modem connected to the splitter unit for bidirectional transmission of data signals in the high-frequency band.

In the preferred embodiment of the integrated telephone set according to the present invention, the transmitted telephone and data signals transmitted via the telephone line are multiplexed by Frequency Division Duplexing FDD.

In a further preferred embodiment, the xDSL-modem is linked to at least one data communication interface for connecting a data communication device to the xDSL-modem.

In a preferred embodiment, the xDSL-modem is activated when a communication device is connected to the data communication interface.

The xDSL-modem is preferably deactivated when the communication device is disconnected from the data communication interface.

This preferred embodiment has the advantage that the xDSL-modem will consume power only during a time period when the data communication device is connected to the modem.

In a further preferred embodiment of the integrated telephone set according to the present invention, a detecting means is provided for detection whether the communication device is connected to the data communication interface.

The splitter unit preferably comprises filter means including high- and low-pass filters for separating the telephone signals from the data signals.

The cut-off frequencies of the high- and low-pass filters are adjustable in a preferred embodiment.

In a preferred embodiment, the telephone is an unshielded twisted pair telephone wire UTP.

In a further preferred embodiment, the communication inter-face comprises a communication port.

The communication port is preferably an Ethernet port, a USB port or an ATM25 port.

In a preferred embodiment, the telephone line is connected to a PBX change unit or a public exchange unit.

In a preferred embodiment of the integrated telephone set according to the present invention, the integrated telephone set is powered by the PBX exchange unit or the public exchange unit.

In an alternative embodiment, the integrated telephone set is powered by a dedicated power supply line.

In a further alternative embodiment, the integrated telephone set is powered by a battery.

In a preferred embodiment of the integrated telephone set according to the present invention, the telephone set has a keyboard which is used to input control data for controlling the status of the telephone set and the status of the xDSL-modem.

In a further preferred embodiment, the telephone set further has a display for displaying status information of the telephone set and status information of the xDSL-modem.

The xDSL-modem is preferably an ADSL-modem, an SDSL-modem or a VDSL-modem.

In a preferred embodiment of the present invention, an analog modem can be connected to the telephone set of the integrated telephone set for data transfer.

This has the advantage that two different modems can be used for simultaneous data transfer using the integrated telephone set according to the present invention.

In a still further preferred embodiment of the integrated telephone set according to the present invention, the keyboard comprises keys to input telephone numbers and keys to input text.

This provides the advantage that the end user can receive data via the xDSL-modem and can send a report concerning the same subject at the same time.

The preferred embodiment of the integrated telephone set with an xDSL-modem according to the present invention will be described in detail with respect to the attached FIGS. 1 to 3.

BRIEF DESCRIPTION OF THE DRAWINGS

FIG. 3 shows a frequency spectrum for data and voice transfer used by the integrated telephone set according to the present invention as shown in FIG. 2.

DETAILED DESCRIPTION OF THE INVENTION

Figure 1:
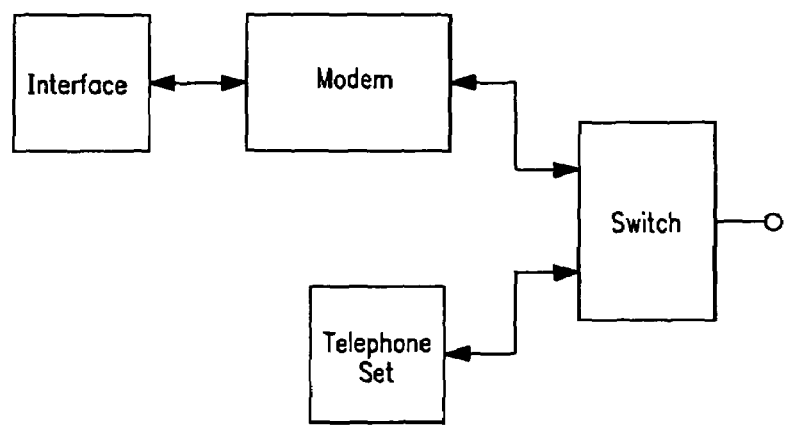
FIG. 1 shows a conventional integrated telephone set according to the state of the art.
Figure 2:
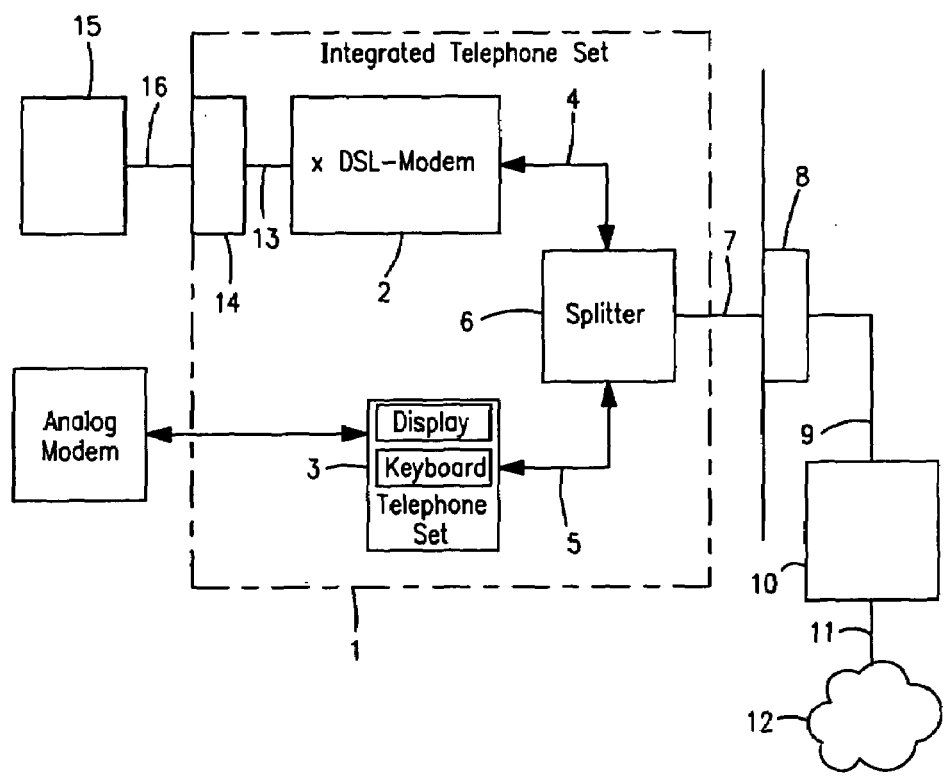
FIG. 2 shows an integrated telephone set with an xDSL-modem according to the present invention.

As can be seen from FIG. 2, the integrated telephone set 1 according to the present invention comprises an xDSL-modem 2 and a telephone set 3. The xDSL-modem 2 and the telephone set 3 are both connected via lines 4, 5 to a splitter unit 6. The splitter unit 6 is connected via line 7 to a telephone socket 8 which is linked via a line 9 to a PBX exchange unit 10 which is connected via a line 11 to a telephone network 12. The xDSL-modem 2 is connected via a line 13 to an interface 14 having a port to connect a data communication equipment unit 15, such as a laptop or a personal computer, via a connection line 16 to the integrated telephone set 1 according to the present invention. The communication port of the communication interface 14 is either an Ethernet port, a USB port oder an ATM25 port. Any further common interface for data communication can be used.

The telephone line 9 is a conventional unshielded twisted pair telephone wire UTP made of copper. Via the telephone line 9 both telephone signals and the data signals are exchanged between the integrated telephone set 1 and the local PBX exchange unit 10 of the telephone network 12. According to the present invention, the telephone signals and the data signals are transmitted in different frequency bands as can be seen in FIG. 3. The telephone signals which are used to exchange voice information are transmitted in a low-frequency band preferably in a frequency range reaching from 0 Hz to about 4 kHz. The data signals, in contrast, are transmitted in very high frequency ranges having frequencies of at least 1 MHz. The separation of telephone services and data communication services is achieved by Frequency Division Duplexing FDD. In FDD, the data transfer from the integrated telephone set 1 to the PBX exchange unit 10 (upstream) and the data transfer from the PBX exchange unit 10 to the integrated telephone set 1 (downstream) is performed in two separate frequency bands as can be seen in FIG. 3. The data signal transfer and the telephone signal transfer is performed in two completely separated frequency ranges on the same twisted pair telephone wire 9 so that both signals cannot interfere with each other. The PBX exchange unit 10 which operates at the opposite end of the telephone line 9 separates the signals in the frequency domain so that each signal can be treated separately.

The splitter unit 6 of the integrated telephone set 1 separates the telephone signals received via the telephone line 9 in a low-frequency band from data signals received in a high-frequency band. To this end, the splitter unit 6 comprises filter means for separating the telephone signals from the data signals. These filter means includes a low-pass filter for separating the telephone signals and a high-pass filter for separating the data signals. The cut-off frequencies of the high and low-pass filter within the splitter unit 6 are preferably adjustable. The data signal that is transmitted to the data modem 2 over the twisted pair telephone line 9 uses frequencies that are not used by the traditional telephone system and can therefore be multiplexed onto the twisted pair telephone line 9 by the use of analog filtering. The complete separation of data signals and telephone signals in the frequency domain assures that a fault in the data communication link will not cause a failure of the telephone service. The integrated telephone set 1 according to the present invention as shown in FIG. 2 will continue to provide a life line operation while adding additional data services in a separate frequency band.

In a preferred embodiment, the xDSL-modem 2 is activated only when a communication device 15 is connected to the data communication interface 14. As soon as the communication device 15 is disconnected from the data communication interface 14, the xDSL-modem is deactivated. The connection of the data communication device 15 to the data communication interface 14 is detected by a detecting means which detects either the mechanical or the electrical connection of the data communication device 15 to the data communication interface 14.

In a preferred first embodiment, the integrated telephone set according to the present invention receives the power from the data communication device 15 connected to the data communication interface 14. The original telephone functions are powered by the local PBX exchange unit 10 as in conventional telephone sets. The power supply of the xDSL-modem 2 via the data communication device 15 can e.g. be performed by a USB connector found in every conventional laptop PC or personal computer.

In a second alternative embodiment, the integrated telephone set 1 according to the present invention is completely powered by remote feeding through the PBX exchange unit 10 via telephone line 9.

In a third alternative embodiment, the integrated telephone set 1 power supply is performed by a dedicated power supply line.

In a fourth alternative embodiment of the integrated telephone set 1, the integrated telephone set 1 is powered by an integrated battery.

The data communication modem 2 is preferably only connected to the power supply when the detection means detects that the data communication device is connected to the data communication interface 14. Consequently, the power consume of the integrated telephone set 1 according to the present invention is very low when no communication device 15 is connected to the integrated telephone set 1.

In a preferred embodiment, the integrated telephone set 1 as shown in FIG. 2 further comprises a keyboard which can be used to input control data for controlling the status of the telephone set 3 and the status of the xDSL-modem 2 within the integrated telephone set 1. The integrated telephone set 1 according to the present invention further preferably includes a display which is used to display status information of the telephone set 3 and status information of the xDSL-modem 2 to the user. This makes it easy for the user to handle the operation of the integrated telephone set 1. The keyboard of the telephone set 3 comprises both keys to input telephone numbers and keys to input text. This will enable the user to easily send a written report. A typical application could be in a hospital, when a doctor downloads data concerning a patient to a laptop 15 connected to the integrated telephone set 1 and can simultaneously type a report concerning the same patient using the keyboard of the telephone set 3.

To the telephone set 3 of the integrated telephone set 1, an analog modem can be connected for data transfer. In this configuration, the integrated telephone set 1 according to the present invention can be used to exchange data simultaneously with two modems, i.e. xDSL-modem 2 and the analog modem connected to the telephone set 3. A typical application for using two modems simultaneously would be when a user checks his E-mails and performs a time-consuming download of a big file at the same time. With the integrated telephone set 1 according to the present invention, it is possible to perform data transfer on two different modems, namely an xDSL-modem and an analog modem at the same time, because the analog modem uses the low-frequency bands for data transfer and the xDSL-modem uses high-frequency bands for data transfer.

The xDSL-modem 2 of the integrated telephone set 1 can be any DSL-modem, such as an ADSL-modem, an SDSL-modem or a VDSL-modem.

The integrated telephone set 1 integrates a high-speed data modem 2 and a telephone set 3 thus reducing the necessary size and power consumption. Further, the input means, i.e. keyboard, of the telephone set 3 can also be used for controlling the data modem 2. A complete separation of data signal transmission and telephone signal transmission ensures that a fault in the data communication link will not cause a failure of the telephone service. The integrated telephone set 1 according to the present invention makes it further possible to use two different modems at the same time thus increasing the possible data transfer rate. The xDSL-modem 2 is activated in the preferred embodiment only, when the data communication device 15 is connected, thus reducing the over-all power consumption of the integrated telephone set 1.

What is claimed is:

1. Integrated telephone set with an xDSL-modem, comprising:

(a) a splitter unit for separating telephone signals received via a telephone line in a low-frequency band from data signals received in a high-frequency band via the telephone line;
   (b) a telephone set connected to the splitter unit for transmission of telephone signals in the low-frequency band;
   (c) a high-speed xDSL-modem connected to the splitter unit for transmission of data signals in the high-frequency band;
   (d) wherein the high-speed xDSL modem is linked to at least one data communication interface for connecting a data communication device to the xDSL modem;
   (e) wherein the xDSL modem is activated when the data communication device is connected to the data communication interface, and wherein the xDSL modem is deactivated when the data communication device is disconnected from the data communication interface;
   (f) the activated xDSL modem being powered by the data communication device;
   (g) the telephone set being powered via the telephone line by a local PBX exchange unit; and
   (h) a detection means for detecting whether a data communication device is connected to the data communication interface.

2. The integrated telephone set according to claim 1, wherein the transmitted telephone and data signals transmitted via the telephone line are multiplexed by Frequency Division Duplexing (FDD).

3. The integrated telephone set according to claim 1, wherein the splitter unit comprises filter means for separating the telephone signals from the data signals.

4. The integrated telephone set according to claim 3, wherein the filter means includes a low-pass filter for separating the telephone signals and a high-pass filter for separating the data signals.

5. The integrated telephone set according to claim 4, wherein the cut-off frequencies of the high- and low-pass filters are adjustable.

6. The integrated telephone set according to claim 1, wherein the telephone line is an unshielded twisted pair telephone wire (UTP).

7. The integrated telephone set according to claim 1, wherein the data communication interface comprises a communication port.

8. The integrated telephone set according to claim 7, wherein the communication port is an Ethernet port, a USB port or an ATM25 port.

9. The integrated telephone set according to claim 1, wherein the telephone set has a display which is used to display status information of the telephone set and status information of the xDSL-modem.

10. The integrated telephone set according to claim 1, wherein the xDSL-modem is an ADSL-modem, an SDSL-modem or a VDSL-modem.

11. The integrated telephone set according to claim 1, wherein the analog modem can be connected to the telephone set of the integrated telephone set for data transfer.

12. The integrated telephone set according to claim 1, wherein the telephone set has a keyboard which is used to input control data for controlling the status of the telephone set and the status of the xDSL-modem.

13. The integrated telephone set according to claim 12, wherein the keyboard comprises keys to input telephone numbers and keys to input test characters.

* * * * *